United States Patent
Knott et al.

[11] 3,889,230
[45] June 10, 1975

[54] CAPACITIVE TRANSDUCER AND METHOD OF USING THE SAME

[75] Inventors: Sydney T. Knott, Barnstable; Frederick R. Hess, Waquoit; Richard T. Nowak, North Falmouth, all of Mass.

[73] Assignee: Woods Hole Oceanographic Institution, Woods Hole, Mass.

[22] Filed: Sept. 2, 1966

[21] Appl. No.: 576,979

[52] U.S. Cl. .......................... 340/17; 340/7; 340/13
[51] Int. Cl. ............................................. G01v 1/38
[58] Field of Search ............................ 340/13, 17, 7

[56] References Cited
UNITED STATES PATENTS

| | | | |
|---|---|---|---|
| 1,584,613 | 5/1926 | Comstock et al. | 340/13 UX |
| 2,581,091 | 1/1952 | Foster | 340/13 UX |
| 2,649,579 | 8/1953 | Alexander | 340/17 |
| 2,965,877 | 12/1960 | Stein et al. | 340/13 |
| 3,070,775 | 12/1962 | Andrews, Jr. | 340/13 X |

*Primary Examiner*—Maynard R. Wilbur
*Assistant Examiner*—N. Moskowitz
*Attorney, Agent, or Firm*—Kenway & Jenney

[57] ABSTRACT

A capacitive type pressure sensitive transducer having the general form of a coaxial cable may be used as a continuous line hydrophone. The transducer has minimum sensitivity to pressure waves travelling parallel to its principal dimension, but high sensitivity in the directions normal to it. An inner conductive member is covered by a compressible cellular dielectric layer, over which is another conductive member of cylindrical configuration.

9 Claims, 4 Drawing Figures

SYDNEY T. KNOTT
FREDERICK R. HESS
RICHARD T. NOWAK
INVENTORS

BY Kenway Jenney
+ Hildreth
attorneys

CAPACITIVE TRANSDUCER AND METHOD OF USING THE SAME

The present invention relates generally to pressure sensitive capacitive transducers, and more particularly to a novel construction and novel applications including use as a directional hydrophone in continuous underwater geological profiling.

Such profiling is carried out by transmitting broad spectrum, on-directional, regularly recurring elastic pulse waves from a moving position near the water surface, the waves travelling to and through the interfaces of submerged and sub-bottom geological strata and being reflected from the interfaces. The reflected waves are then received at or near the water surface by means of transducer equipment, which in this application comprises one or more hydrophones. These waves are used to produce graphic records either directly or with intermediate storage, for example on magnetic tape. The method is generally described in U.S. Pat. No. 3,065,815 to Hersey and Knott.

More specifically, this invention relates to an improved pressure sensitive line transducer of simple construction and extended length which, when employed as described herein, produces a higher signal-to-noise ratio and better graphic records with greater ease of handling, as compared with prior art transducer systems.

An appreciation of the objects and features of this invention can be gained from a general understanding of its application to the technique of seismic profiling described in the above patent. Briefly, the technique requires production of pulses such as underwater spark discharge pulses having a broad band frequency content including frequencies high enough to produce appreciable reflections or echoes from the botton and low enough to penetrate to the deepest interfaces of interest. The pulse source and receiving hydrophone are in most cases moved continuously. The receiving hydrophone as described in the patent is constantly maintained at a position in close proximity to the source, and must be capable of responding over a broad band from less than 10 to several thousand Hertz, for example, although in any given hydrographic area the amplifying and recording equipment may be used to select only a portion of the total received bandwidth for the study of the seismic reflections from the geological structure.

In a common arrangement, the graphic recorder produces a paper strip record of several inches width, longitudinally calibrated in units of time which are related to horizontal distance travelled, and transversely calibrated in units of time which measure the travel time of the seismic pulses. Near one margin of a typical record is a pulse mark representing the moment of production of a particular brief elastic wave pulse. Along a transverse line through the pulse mark there appear a number of other marks produced by reflections or echoes of that particular pulse from various objects such as the interfaces of geologic strata, each such mark being spaced from the pulse mark by a distance proportional to the time between production of the pulse and reception of its reflection by the receiving transducer. The graphic record contains many pulse marks in close, longitudinally spaced formation, each having its corresponding reflection marks. This is accomplished by moving the source and receiving transducer in or behind a ship at constant speed over the water while sending out a continuous succession of pulses.

A typical record has an appearance somewhat like a geological section of the reflecting interfaces beneath the floor of the sea, and comprises several longitudinal bands made up of such marks, the bands being mutually spaced as a function of all the factors that influence the travel time of the pulse from source to receiving transducer. Such factors include the path taken by the pulse, the spacing of reflecting interfaces and the rate of travel of the pulse in each medium through which it travels.

The interpretation of the graphic record includes a number of techniques principally including the identification of correlated pulse returns which define the interfaces between structures which have sufficiently different acoustical impedances to cause reflections. If the information in the record is supplemented by knowledge of the propagation velocities, it is ordinarily possible to derive from the record an accurate cross-section to scale of the sub-bottom strata along the path of travel taken by the source and receiver. To obtain good horizontal definition the pulses must emanate from positions spaced horizontally by a distance as small as the smallest horizontal feature of interest. The pulses must also be short enough to permit distinguishable marks to be produced by reflections from two depths separated by the smallest vertical feature of interest.

It is a further feature of the method described in the above patent that the source produces, and the receiving transducer is designed to receive, elastic waves of a non-directional character. When source and receiver are towed near to one another useful reflections are those that occur close to or right-angles to an interface, for those occurring at other angles do not return to the receiving transducer.

One of the problems that may be encountered with the technique described in the above patent, which may be attributed to both its broad band sensitivity and its non-directionality, is the presence of unwanted signals which for the purposes of seismic reflection wave studies and similar studies are regarded as noise, and which are expressed in the form of unwanted marks in the graphic record. Some of these marks represent reflections from transmitted pulses, but the bulk of the noise ordinarily results from external sources of elastic waves. Such noise, in any case, tends to obscure the finer details in the record and to impede the precise use of graphic techniques of interpretation. Thus, at certain times reflections cannot be unambiguously distinguished in the record from noise which falls in that portion of the spectrum where the reflected energy from a geological structure of interest is found. In general, noise may be distributed over a wide frequency spectrum, and may travel through the water to the receiving hydrophone at a wide range of angles to the vertical and through the actual hydrophone supporting structures and tow cables directly to the receiver elements.

Some types of noise can be visually identified in the record, such as the "double reflections" described in the above patent, that is, reflections that result from waves that have been reflected by the water surface and have completed a second transit of the downward path and return. Reflected signals from schools of fish and other ships may also be received, and they typically produce records that vary in a characteristic, identifiable manner. Also, the roughness and irregularity of the bottom and interfacial contours unavoidably result in chance, non-recurring reflections from surfaces whose general contours are not normal to the direction of impinging pulse waves.

Among the more troublesome sources of noise are two sources introduced by the apparatus employed in the method itself. One is "propulsion noise" generated by the propulsion machinery of the towing ship. The other is "tow noise" generated by the vibration or buffeting in the waves of the towing cable and the turbulence that the hydrophone produces as it passes through the water. It is an object of this invention to reduce the effect of these noise sources, which are particularly troublesome in the frequency range below about 500 Hertz.

Propulsion noise results from the sensitivity of the hydrophone to elastic waves emanating from the ship in a substantially horizontal direction. It occurs within the frequency range of useful seismic reflection data, especially at low frequencies, for example 500 Hertz or lower. In an effort to reduce this noise, one known method is to tow the source and receiver at a substantial distance from the ship, but this has the disadvantage that the cables, which in some cases are several hundreds of feet in length, add to the tow noise and may introduce substantial electrical transmission losses. There must also be suitable cable handling gear, and it becomes difficult to tow the source and receiver at the uniform controlled depths necessary to attain maximum transmission and reception efficiency, as further described below.

Another known method of reducing the effect of propulsion noise is to reduce the sensitivity of the hydrophone receiver to pressure waves propagated from the direction of the towing ship, that is, horizontally. A directional arrangement can be produced by employing an array of discrete hydrophones towed in a horizontal line, each adapted to contribute to the over-all response. The hydrophone responses may be additive in some cases, for example the case of a horizontal wavefront, and subtractive in others, for example, the case of a horizontally travelling wave having a wavelength which when impressed along the array is equal to twice the distance between adjacent hydrophones. Such arrays have been employed with some success, but important limitations have been noted especially in applications such as seismic profiling where a broad band of frequencies is to be received. Analysis of such arrays shows that there are undesirable responses to pressure waves depending on the angle of incidence, that is, the angle between the direction of wave propagation towards the line and the plane normal to the longitudinal axis of the line, and also upon the relationship of the wavelength to the spacing between the hydrophones. One of the results is that at certain frequencies the array is noticeably sensitive to wavefronts impinging at particular angles in the range between the vertical and the direction of the towing ship. At other frequencies there is noticeable sensitivity at different angles within this range. One illustration of the resulting ambiguity in the graphic record is furnished by the case of a 5-hydrophone array with a given spacing between adjacent hydrophones. Such an array has been shown to be very sensitive to pulses with a wavelength equal to half this distance travelling at an angle of incidence of 30°, that is, at 60° measured from the principal or longitudinal dimension of the array. As a result, the graphic record of seismic reflections would be misinterpreted if the 30° reflections were construed as 0° reflections which produce a similar response of about the same amplitude.

The multiple discrete element line array has other disadvantages when the signal, noise or otherwise, is of a sharp transient nature. This arises because the spacing of receiving elements of such an array is of finite lengths, when such transients are of shorter duration than the travel-time of the sound from element to element. Although these transients are received at reduced sensitivity because only one hydrophone at a time is struck by their wavefronts, the peaks of high amplitude can obscure useful detail in wanted signals. For example, it can be seen that at angles of sound incidence other than normal to the longitudinal axis such a transient pulse produces a plurality of spaced pulses, and during the profiling process upwardly moving reflected wavefronts will cross the hydrophones successively, spread in time, rather than all simultaneously. Any transient noise impinging at any angle of incidence other than normal results in a multiplicity of noise pulse arrivals equal in number to the number of elements, and spaced in time as a function of element spacing and angle of incidence. Furthermore, since these arrays are by their structural nature difficult to maintain at constant towing depth, even desired pulses of short length can result in multiple rather than single pulse arrivals from a single interface. As a result the reflected arrival from one interface will not appear as one reflecting interface but as a multiplicity of interfaces causing unwanted ambiguities and loss of resolution between interfaces.

A still further object is to employ the new technique in other applications where it is desirable to have a preferential reception of sound fronts approaching line receivers on paths perpendicular to their longitudinal axes, for any selected attitudes of the lines.

A still further object, as applied to procedures other than profiling, is to develop directivity patterns or lobes of sensitivity other than those afforded by prior art structures such as the discrete element arrays.

It is a further object of this invention as applied, for example, to seismic profiling, to employ a directional technique as a means of discriminating against waves that are not travelling vertically, and in particular against propulsion noise, while avoiding such ambiguities inherent in the response of an array of plural spaced hydrophones.

With the above and other objects in view, as hereinafter appearing, the features of this invention include a directional pressure sensitive capacitive transducer having the general form of a towable coaxial cable or line hydrophone which has minimum sensitivity to pulse waves travelling parallel to its longitudinal or principal dimension, but high sensitivity in the directions normal to the longitudinal dimension. This pressure sensitive device utilizes the principle that a change in voltage across a charged capacitor can be produced by changing the capacitance as a function of pressure. This is embodied in a form which includes at least two coaxial cylindrical conductors separated by highly compressible dielectric material such as closed cell resilient plastic foam. Sensitivity has been found to be very adequate over the bandwidths required in reflection studies. When an appropriate length of the cablelike device is towed in a substantially straight line behind the ship, it provides an excellent sensor of water borne sound propagated normally to the longitudinal axis.

According to another feature the line hydrophone preferably has nearly neutral buoyancy which tends both to lessen the tow noise and to insure that the sensor and tow cable will be towed at a uniform depth even when the speed of the ship is at a minimum.

Still another feature is the ease of handling the line hydrophone and especially of controlling the relative geometry of the source, receiver, sea surface and sea floor. Also, the simplicity of construction of the hydrophone and the ease of varying its specific gravity and capacitance in manufacture will be readily appreciated.

Still another feature resides in the fact that the improved capacitive line hydrophone may be readily manufactured in any necessary length by means of standard cable extrusion machinery. The only manual operations necessary to put the material to use are those of making suitable electrical and mechanical connection to the material. The continuous line hydrophone material may be carried or stored in a continuous long length and elements of desired length may be cut off this supply and placed in service in less than one hour.

Other features reside in certain details of the improved structure, method, apparatus and mode of operation that will become evident when considered with reference to the following description, in which FIG. 1 is a diagrammatic view illustrating the application of the invention in underwater geological profiling;

Figure 1:
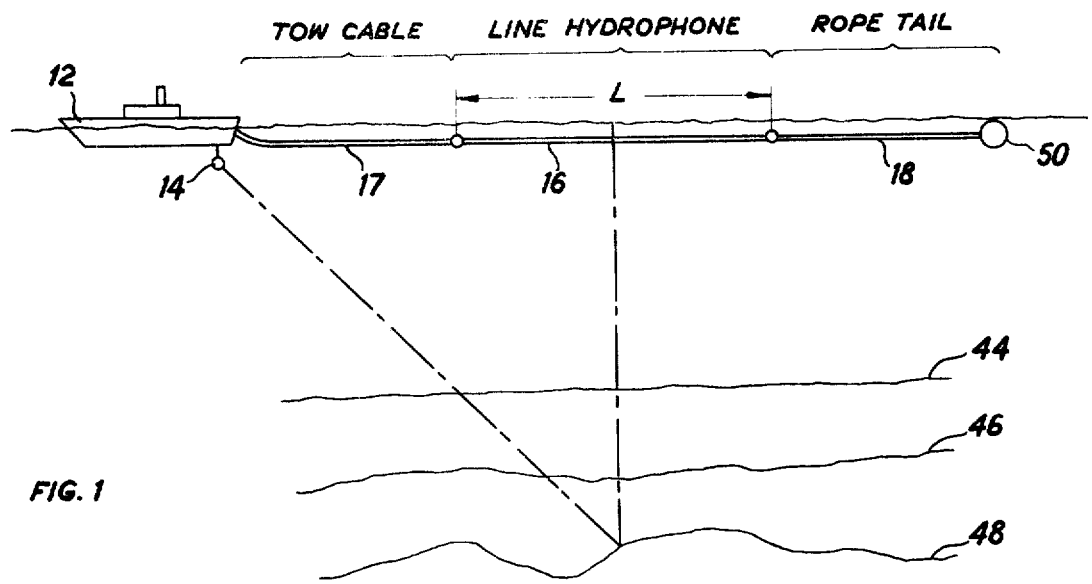
Figure 2:
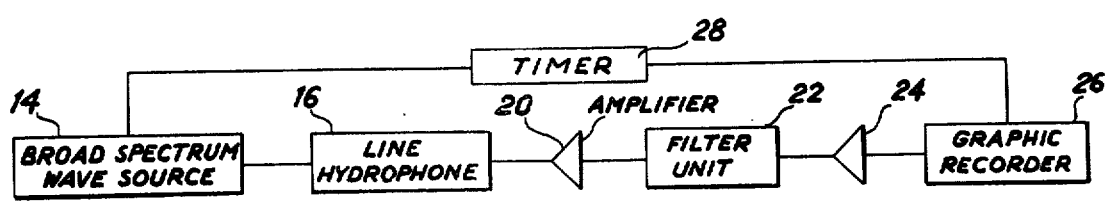
FIG. 2 is a block diagram of a simplified form of the surveying apparatus.

Referring to FIGS. 1 and 2, much of the equipment used for obtaining a survey record is similar to that described in the above patent. A simplified version of the circuit is shown for ease of understanding, although it is obvious that more sophisticated electronic and mechanical receiving and transmitting equipment can be substituted. A ship 12 carries an elastic wave source 14 in direct contact with the water and within several feet of the surface. The source is of small dimensions (exaggerated in the drawing) and has a nondirectional output of very broad frequency spectrum, as distinguished from the high frequency, narrow band sources commonly employed in depth sounding. Built as described in the above patent, it can have, but is not in all cases required to have, a high rate of pulse repetition. Explosives may be used. In seismic profiling the pulses are commonly short, of explosive nature with peak pressure amplitudes preferably well above 70 decibels referred to one dyne per square centimeter. A typical source is a high voltage sparker providing an electrical discharge between a set of electrodes submerged a few feet below the water surface, resulting in an acoustic pulse of explosive character.

A line hydrophone 16 of length L is trailed at the end of a tow cable 17 from the ship and is preferably several feet below the surface. It is substantially of uniform depth because of its near neutral buoyancy, and straight as a result of the frictional drag of the water on its surface and the further drag of the water on a rope tail 18 of braided nylon tied to its end. The hydrophone is connected to a broad band amplifier 20 which preferably has a flat response characteristic from about 5 to at least 20,000 Hertz and a wide dynamic range. The amplifier is connected to a band pass filter 22 of variable band width which is continuously adjustable from less than 20 to approximately 20,000 Hertz. In operation, adjustment is made as a function of the reflected energy spectrum from the strata under study.

The filter 22 is connected through an amplifier 24 to a graphic recorder 26 which operates as described in the above patent to produce the graphic record. There is also, as described in said patent, a timer comprising a part of the recorder that correlates the initiation of each spark or elastic wave pulse with the writing position so that the latter will be located precisely for example near a margin of the graphic record, when each spark is initiated. The position of each mark transversely of the web is a function of the time lapse from such initiation to the moment a reflection or echo is received.

Figure 3:
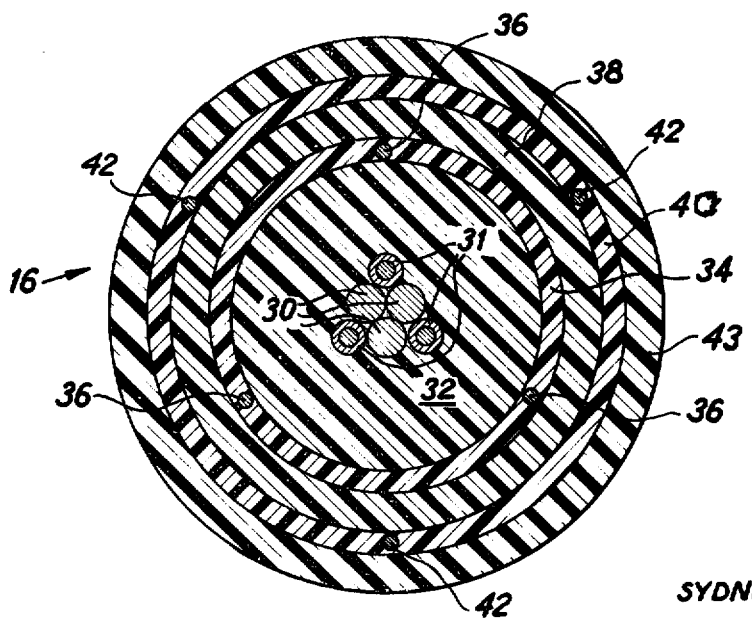
FIG. 3 is a cross-section of an illustrative form of the hydrophone.

The preferred form of the line hydrophone 16 (FIG. 3) includes a core having wires such as three strands of high strength steel 30 which provide most of the strength in tension, and several copper wires 31, each insulated. These copper wires may be used for several purposes such as to connect pressure gages mounted at various positions along the hydrophone, or other auxiliary instrumentation. The core is surrounded by a layer 32 of extruded moderately stiff closed cellular foam such as that made of ethylene propylene copolymer. There is some flexibility in the choice of materials for this layer, and this permits a significant degree of control over the buoyancy of the line.

Over the layer 32 is extruded a layer or cage 34 of flexible, solid, electrically conductive plastic, such as the conductive polyvinyl chloride sold commercially under the name of Abbey No. 6464. Imbedded in this layer are three copper drain wires 36 which are helically and symmetrically wound about the line and used to enhance the axial electrical conductivity of the cage 34.

Over the cage 34 is extruded a layer 38 of nonconductive, resilient, closed cellular foam such as polyvinyl chloride or urethane. This layer comprises the resilient elastic dielectric employed in the hydrophone.

Over the layer 38 is extruded a second layer or cage 40 of solid flexible electrically conductive polyvinyl chloride similar to the cage 34, with three drain wires 42, preferably having a pitch similar to that of the wires 36, and preferably but not necessarily of opposite sense. It is a flexible layer compliant to radial vibration at frequencies in the range from D.C. to several thousand Hertz.

An outside sheath 43, preferably of non-cellular, insulating, waterproof, abrasion resistant material such as urethane or polyvinyl chloride, is extruded over the cage 40. It will be understood that the amplifier 20 is connected between the electrically conductive members 34 and 40.

Various alternatives to the foregoing line structure are also useful. The core, in addition to providing tensile strength, preferably imparts sufficient stiffness to prevent sharp bends that may damage the conductive layers or cages. In place of metallic wires, synthetic or natural fiber rope may be used in some cases. The rope is preferably braided to minimize twisting.

Neutral buoyancy is a desired characteristic for the horizontally towed hydrophone, and the design takes into account the specific gravities of all materials employed, the inner foam core 32 being of a density selected to meet this requirement, as well as being stiffer and less compressible than the layer 38. The uniform cross-section of the hydrophone minimizes any tendency for the tow depth of the array to vary over its length.

The conductive layers can also be built up by wrapping sheet material on the line. These may be sheets of conductive plastic or metallic foils. It is, however, preferable for the purposes of this capacitive device to bond these layers to reduce frictional electrostatic noise.

The illustrated construction in a typical line has a capacitance of about 0.0005 microfarad per foot with an overall diameter under one inch, these figures being given for purposes of illustration and not as limiting cases. The capacitance is subject to substantial fluctuation upon the impingement of elastic waves, such as those produced by the source 14, reflected vertically from the sea bottom 44 and from interfaces 46 and 48 between sub-bottom strata. It will be understood that for most simple usage a direct current charge voltage is applied across the layers 34 and 40, although other techniques familar to the art may be used.

The frequency range of sensitivity is large, and extends from static pressure changes to the order of 10,000 Hertz. Sensitivity may be varied according to the design of the line and the value of the applied or charge voltage. For example, a series of seismic reflections of the signal from an underwater spark having an output pressure of about 126 to 130 decibels referred to one dyne per square centimeter were received on the new line hydrophone in the 30 to 50 Hertz range from structures about 4 kilometers below the ocean floor under about 5.5 kilometers of water.

If desired, additional conductive layers or cages can be added to increase the electrical capacitance. For example, twice the capacitance for a given length of line can be obtained by using three foils, the foil between the inner and outer foils being also continuously shielded by the others which are held at circuit ground.

At the high frequency end, the practical limit in towed applications is ordinarily determined by the speed of towing and other factors which control the orientation or attitude of the hydrophone to the wavefront. At higher speeds the effective sensitivity to higher frequencies is greater because there is more hydrodynamic drag and the line is straighter. As a result, an elastic plane wavefront directed normally to the axis of the line strikes the hydrophone substantially simultaneously throughout its length. At a lower speed there is less drag, the hydrophone may be somewhat sinuous in the water due to the wake of the towing ship and a series of normal incidence high frequency wavefronts will then impinge on different parts of the line sensor at different times. The tendency is for positive and negative portions of the wave to neutralize one another in their overall effect on the capacitance of the line.

The angle of incidence, defined above as the angle between the direction of wave propagation towards the line and the plane normal to the longitudinal axis of the line, is relevant to other features of the hydrophone as well. These features, in general, have to do with the elimination of certain unwanted responses found in other directional hydrophone systems, as discussed above. They may be viewed either from the standpoint of response to a fixed frequency received from various angles of incidence, or from the standpoint of response to a variable frequency received from a fixed angle of incidence.

At any fixed frequency the response of the improved line hydrophone, relative to the response to a wave normally incident to the line, decreases as the angle of incidence changes from 0° toward 90° and passes through successive maxima of diminishing amplitudes and minima, depending upon the dimensions and frequency, and the peaks fall off in amplitude asymptotically. In the case of an array of discrete, spaced hydrophones, this is the case only for certain frequencies. At other frequencies the response of an array of discrete receivers could attain a maximum equal to the normal incidence response at angles of incidence other than 0°.

At a fixed angle of incidence other than 0°, as the frequency is increased the response of the improved line hydrophone passes through successive maxima and minima, the maxima decreasing. For an array of discrete, spaced hydrophones, the response can reach a maximum equal to the normal incidence response as the frequency is increased through certain values, and this generally results in an unwanted source of ambiguity in the graphic record.

The fact that, with the improved line hydrophone the response is appreciably reduced at an angle of incidence of 90° for all frequencies where the array is one or more wave-lenghts long means, in practice, that the line may be towed relatively close to the ship, and in some cases the end of the line can actually be in the towing ship. Preferably, however, the hydrophone is towed at the end of a cable 17 a few tens of feet long.

In practice the line can be handled easily and can be run over sheaves or coiled, thereby minimizing handling problems.

While we have found a length of about 130 feet of line hydrophone quite adequate for many ocean observations, greater lenghts of 500 to 1,000 feet or even more may be found desirable where the above criteria are otherwise met. Moreover, since with this form of hydrophone one end of its useful portion may be relatively close to the ship as compared with the multiple hydrophone arrays previously discussed, lengthy hydrophones do not require the added encumbrance of long tow cables.

Ordinarily, good results are obtained when the hydrophone is towed at a nearly uniform depth in the range of about 5 to 50 feet. Here, the hydrostatic pressure is low and the resilient dielectric layer in the line is not under appreciable steady state compression. When the cross-section and the density of selected materials have been properly designed and formulated the hydrophone is nearly neutrally buoyant under most conditions of water salinity and temperature. If a suitable depressor weight 50 (FIG. 1) such as a towed body is tied to the end of the strain member 18 the desired depth is readily achieved at moderate speeds. Whereas both source and receiver are towed below the sea surface, which is a pressure-relief, phase-inverting reflector, a more continuous spectrum of energy is both transmitted and received more efficiently by towing at a depth of one quarter of the wavelength of the lowest frequency that produces a useful contribution to the output of the source.

Figure 4:
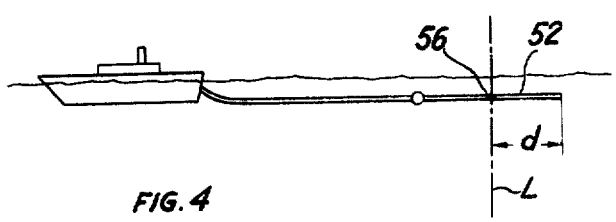
FIG. 4 is a diagrammatic view illustrating a second application of the invention as a focused listening device.

FIG. 4 illustrates another application of the above-described hydrophone. In this case a length 52 of the line hydrophone is used in the form of a circle of radius $d$, lying in a horizontal plane with its center at a point 56. The hydrophone has peak sensitivity to elastic waves emanating from points on a line L, through the center 56 and perpendicular to the plane defined by the circle, since waves from a given point on such a line will strike all points on the hydrophone simultaneously and in phase. However, the receiver will be relatively insensitive to sounds originating from any other location. It will be seen from this illustration that the novel technique herein described may be used to restrict the directivity pattern to more definite directions and it can be readily seen that a plurality of lines, either straight or curved, can be combined to achieve other directivity patterns.

It will be understood that various other adaptations to and modifications of the described apparatus will occur to those skilled in the oceanographic and electronic arts, and these are intended to be included within the spirit and scope of the invention.

Having thus described the invention, we claim:

1. A capacitive line transducer system including a line transducer and an amplifier, said line transducer having, in concentric formation,
   an inner electrically conductive first member having a cylindrical surface area,
   a uniform substantially compressible cellular dielectric layer entirely covering the first member,
   an outer radially flexible electrically conductive third member over the dielectric layer and having a hollow cylindrical configuration and
   an insulating layer surrounding the third member,
   said amplifier being connected between said electrically conductive members and adapted to produce a signal varying with fluctuations in the capacity therebetween.

2. The combination according to claim 1, in which at least one of the electrically conductive members consists of a flexible solid electrically conductive plastic material.

3. The combination according to claim 1 in which the cross section of the transducer is uniform in all directions.

4. The combination according to claim 1 with a body of flexible relatively incompressible material surrounded by and supporting the first member.

5. The combination according to claim 1, with a core having substantial tensile strength and a body of flexible, relatively incompressible material over the core surrounded by and supporting the first member.

6. The combination according to claim 1, in which the dielectric layer comprises a closed cellular foam material.

7. The combination according to claim 1, in which at least one of the electrically conductive members includes a metallic strand imbedded in close electrical connection therewith.

8. The combination according to claim 1, with a body of closed cellular flexible foam material surrounded by and supporting the first member and being of sufficient cross-sectional area to impart a predetermined degree of cross-sectional density relative to water.

9. The combination of claim 4 with an insulated electrical conductor adjacent the core.

* * * * *